United States Patent [19]
Godwin et al.

[11] 3,731,754
[45] May 8, 1973

[54] ELECTRICAL WEIGHING SYSTEMS

[75] Inventors: Gilbert Allan Godwin, Oakland, N.J.; Chapin A. Pratt, Rutland, Vt.

[73] Assignee: Howe Richardson Scale Company, Clifton, N.J.

[22] Filed: Nov. 5, 1971

[21] Appl. No.: 196,235

Related U.S. Application Data

[62] Division of Ser. No. 58,259, July 27, 1970, Pat. No. 3,659,665.

[52] U.S. Cl..............177/165, 177/210, 177/DIG. 3
[51] Int. Cl. ............................................G01g 13/14
[58] Field of Search.....................177/165, 210, 211, 177/DIG. 3

[56] References Cited

UNITED STATES PATENTS

| | | | |
|---|---|---|---|
| 3,044,563 | 7/1962 | Gumpertz et al. | 177/165 UX |
| 3,073,398 | 1/1963 | Blodgett et al. | 177/165 X |
| 3,077,940 | 2/1963 | Blodgett et al. | 177/165 |
| 3,446,299 | 5/1969 | Leonowicz | 177/211 X |

*Primary Examiner*—George H. Miller, Jr.
*Attorney*—James E. Nolan et al.

[57] ABSTRACT

A weighing apparatus and method wherein an electrical analog signal, having a level representative of the weight of a load, is converted into a digital pulse train by an analog-to-digital converter. A counter for counting the converter-produced pulses is connected to one or more devices that provide a read-out of the weight in visual and/or printed form. A program circuit is operatively connected to the converter and the counter, and selected circuit connections are made in the program for providing a selected one or more of the following conditions: (1) the division of the pulse train by a pre-selected divisor to count in only the quotient at the counter (2) the transfer of selected information from the counter to the read-out devices to cause the weight to be read out by counting in any of a plurality of different increments such as ones, twos or fives. Additional features pertain to tare circuits for taring the weight-representing signal.

2 Claims, 12 Drawing Figures

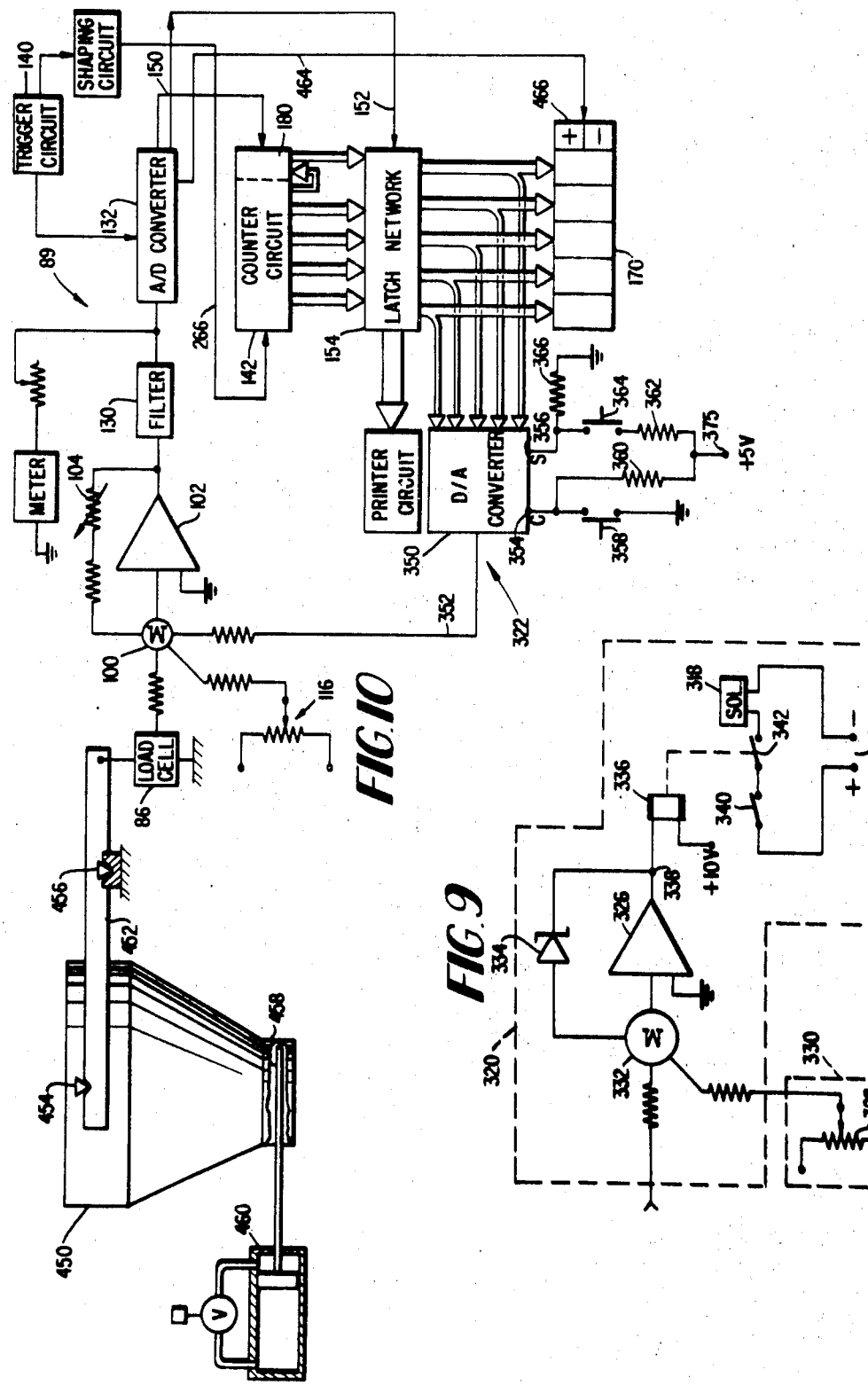

ELECTRICAL WEIGHING SYSTEMS

This is a division of application Ser. No. 58,259 filed July 27, 1970, now U.S. Pat. No. 3,659,665.

FIELD OF INVENTION

This invention relates to weighing apparatus and methods. This invention is particularly concerned with the type of electrical weighing system wherein an electrical signal is developed as the measure of a load applied to the weighing machine.

BACKGROUND

Prior to this invention is has been the practice to utilize force-to-electrical signal transducers or load cells to measure the weight of a load applied to the load-receiving member of the weighing apparatus. Such transducers or load cells can produce an analog D.C. signal voltage which is closely proportional to the weight of the applied load.

More recently, a preference and need has developed for an electrically-produced, digital read-out in visual form, printed form, or both. As a result, it became necessary to incorporate an electrical analog-to-digital converter into the system to convert the analog, weight-representing signal into a digital representation. Some of these converters produce a train of pulses, the number of which is proportional to the magnitude of an applied analog voltage at a given moment.

Commercially available analog-to-digital converters vary in rating and characteristics which cause complications and difficulties when matching the converter to different load cell or scale capacities. In this connection it will be appreciated that an analog-to-digital converter of a given rating or characteristic will only produce a predetermined maximum number of pulses in response to a predetermined analog voltage level. For example, the converter may produce 10,000 pulses in response to a 10 volt signal. Each pulse, therefore, will represent an equal part of the input voltage.

In electrical weighing systems the analog signal voltage, such as the 10 volts mentioned above, is the result of the gain applied to a load cell potential by an amplifier To match the analog-to-digital converter the amplifier advantageously has a span of 10 volts. For a 10,000 pound gross weight scale, the full span of 10 volts is readily utilized since each pulse produced by the analog-to-digital converter will represent and can be counted as one pound.

If, however, the same 10,000 pulse converter is applied to a 5,000 pound scale, an upward gain adjustment to utilize the available span of 10 volts would result in an erroneous read out of 10,000 pounds when a 5,000 pound load is placed on the scale. Prior to this invention, the foregoing complication was avoided by utilizing only a part of the available span. For a 5,000 pound scale, for example, only one-half of the available span is utilized. Thus, the application of a 5,000 pound load to the scale will produce a 5 volt signal, and the 10,000 pulse converter will produce 5,000 pulses.

It will be appreciated that the foregoing technique will utilize only a part of the available gain, and for the example given above, the 5,000 pound scale would be utilizing only one-half of the available gain. In effect, therefore, this prior art technique constitutes a downward adjustment to a gain that is significantly less than the gain that could be applied if it were not for the equipment utilizing the signal. Such a downward adjustment from the available gain is undesirable and disadvantageous, for it significantly degrades the accuracy and resolution of the system as compared with results that could be achieved by utilizing the full span of the amplifier.

SUMMARY AND OBJECTS OF INVENTION

The circuit of this invention enables analog-to-digital converter and digital read-out equipment of a given rating to be applied to a variety of different load cell or scale capacities (i.e., gross weights), without a downward adjustment from the available load cell voltage gain and without the attendant disadvantages associated with such a downward adjustment from the available gain. This is one of the objects of this invention, and it is essentially accomplished by maintaining a relatively high load cell voltage gain and by dividing the pulse train produced by the analog-to-digital converter by predetermined values.

Considering the foregoing example, the circuit of this invention enables the full span of 10 volts to be utilized for a 5,000 pound scale. Twice as much gain is therefore provided as compared with the prior technique mentioned above. According to the present invention, a program circuit is connected between the analog-to-digital converter and a multi-decade 8-4-2-1 BCD counter for counting the weight-representing pulses produced by the converter. When the 10,000 pulse converter is used in conjunction with a 10,000 pound scale, the full 10 volt span is utilized, and the program supplies all of the converter-produced counts to the counter. When the 10,000 pulse converter is applied to a 5,000 pound scale, the gain is adjusted to again utilize the full 10 volt span. Thus, the application of a 5,000 pound load to the 5,000 pound scale will produce a 10 volt signal, and the 10,000 pulse converter will correspondingly produce 10,000 pulses. According to this invention, program circuit connections will now be made to connect a pre-stage divider between the converter and the counter to divide the number of counter produced pulses by one-half. The counter will consequently only count one-half the number of converter produced pulses. Thus, a gross load of 5,000 pounds produces a high gain analog signal voltage of 10 volts (i.e., the same as that in the 10,000 pound capacity system). The converter will therefore generate its maximum of 10,000 pulses, and this count will be divided by two, leaving 5,000 pulses to be counted and displayed in decimal form.

According to a further aspect of this invention, at least the units decade counter state in the multi-decade counter performs dividing functions, and in one embodiment is capable of dividing by twos and fives. By selectively arranging the electrical connections to the various terminals at the units decade counter stage, the read-out or weight display device can be made to count in displayed increments of ones, twos, or fives. Moreover, selected circuit arrangements between the pre-stage divider, the units decade counter and a latch for memorizing the BCD output of the counter provides a wide variety of gross weight read-outs and incremental counting conditions without changing the analog-to-digital converted or the read-out equipment. For example, either a gross weight of 10,000 pounds or 5,000 pounds may be read out by counting in displayed increments of ones, twos or fives in a system having the previously mentioned 10,000 pulse converter. Using the same 10,000 pulse converter, a gross weight of 50,000 pounds may be read out, counting in displayed increments of fives.

The capability of causing a visual digital display to read out in diplayed increments that are greater than one is advantageous, for under certain conditions, it tends to improve the stability of the displayed count. For example, the display may sometimes alternate between two successive numbers or counts in its lowest order decade owing to such factors as noise pickup and other things. For an illuminated display, the read-out will therefore flicker making the observation of the number more difficult. By not displaying the total number of converter pulses, the chances of observing the alternation are reduced. As a result, the read out will be more stable.

Furthermore, the capability of reading out the weight in displayed increments greater than ones widens the versatility of the system without requiring a change in the analog-to-digital converter or the read-out equipment. For example, a gross weight of 50,000 pounds, as previously mentioned, may be counted and displayed even though the maximum pulse output of the analog-to-digital converter is only 10,000 pulses. This is accomplished by dividing the input count by two in the unit decade counter stage, by transferring the data information on the weighted bit position of 1 at the output of the units decade counter to the tens decade counter stage and also to the weighted bit position of 1 and 4 at the display-driving BCD latch, and by clamping the 2 and 8 weighted bit positions of the latch to a fixed logical state, thereby rendering them inoperative. For each converted-produced counter pulse counted by the units decade counter stage, the logical state at the weight-of-1 position of the counter output is changed, and this information is transferred to both the 1 and 4 weighted bit postions at the latch between the counter and the display. Since the 1 and 4 weight bit positions in BCD add up to a 5, the display will respond to each counted pulse by successively displaying zeros and fives at its units decade. Thus, the display is operative to read out a gross weight of 50,000 pounds in displayed increments of fives.

According to another feature of this invention, a latching circuit is connected between the multi-decade BCD counter and the read-out device to memorize the BCD information at the output of the counter in response to a command signal, and a feedback circuit is provided between the output of the latching circuit and a summing junction at the input to the load cell conditioning amplifier. The output of the load cell will also be connected to this summing junction, and the feedback circuit contains a digital-to-analog converter which upon command will sample the BCD data information and memorize or hold the sampled information. The digital-to-analog converter converts the memorized information into an equivalent analog signal voltage which is fed back to the amplifier input summing junction with a polarity that tares out the existing load cell signal at the summing junction. By utilizing a bi-polar analog-to-digital converter with this taring arrangement, the amount of material removed from a storage hopper or silo can be read out by weighing the material in the hopper before and after a portion of it is dispensed.

This invention also provides another form of tare circuit which may be utilized when the tare weight of the truck or container is known or can be determined by weighing the vehicle or container. The tare signal provided by this second form of tare circuit is selectively set by suitable means (such as a potentiometer) and is applied to the read-out circuit in such a manner that it is converted by the analog-to-digital converter and read out in the digital readout device. This form of tare circuit is convenient to operate, inexpensive to manufacture, and utilizes the available high resolution of the electrical digital conversion and read-out equipment.

In addition to the foregoing objects, another object of this invention is to provide a novel batch weighing system in which delivery of a plurality of materials for making up a batch formula is controlled by analog signals and in which read-out of the weight of delivered materials is in digital form.

These and other objects will appear as the description proceeds in connection with the appended claims and the below-described drawings.

DESCRIPTION OF DRAWINGS

FIG. 9 is a schematic diagram of the analog cut-off and weight selection circuit in FIG. 8; and FIG. 10 is a schematic diagram showing another application of the tare circuit illustrated in FIG. 8.

DETAILED DESCRIPTION

Figure 1:
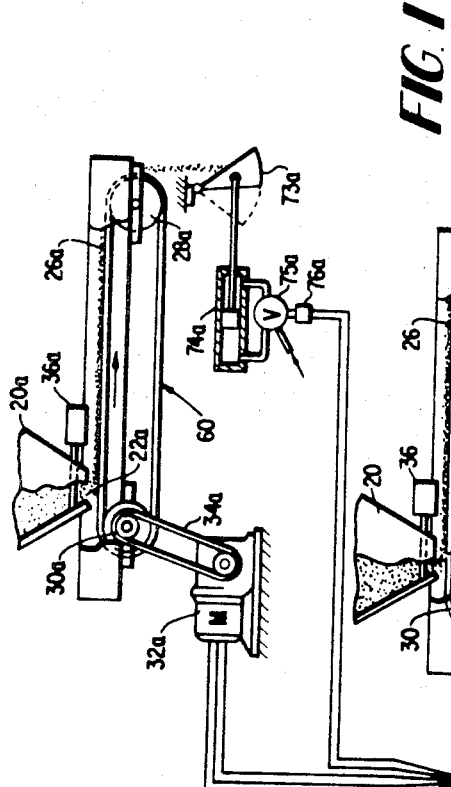
FIG. 1 is a partially functional, schematic diagram of a batch weighing system according to one embodiment of this invention.

The embodiment shown in FIG. 1 is a batch weighing system for weighing out pre-selected weights of one or more ingredients in a batch formula. Preferably, the mechanical equipment for the embodiment shown in FIG. 1 is essentially the same as that described in Gerald C. Mayer's pending patent application Ser. No.

658,229 (Now United States Letters Patent No. 3,528,518) filed on Aug. 3, 1967 for Automatic Batch Weigher and assigned to the assignee of this application. It will be appreciated, however, that any appropriate, suitable form of mechanical scale equipment may be utilized in conjunction with this invention.

In general, the batch weighing apparatus shown in FIG. 1 comprises a storage hopper or bin 20 having an open bottom 22 for delivering a first fluent or particulate material in a layer upon an endless belt of a conventional power-driven feeder 24. Feeder 24 has an upper belt flight 26 which is horizontal and which moves from left to right in FIG. 1 between pulleys 28 and 30. An electric motor 32 is connected to pulley 30 by an endless chain 34 to advance the belt. A manually operated discharge gate 36 may be provided to cut off the delivery of material from bin 20 to feeder 24. The material passing through the open bottom 22 of bin 20 is advanced in a layer on the upper belt flight 26 of feeder 24. This material falls off the end of the flight as it passes around pulley 28 and descends in a freely falling, continuous column into a weigh-hopper 38. In this embodiment, feed 24 is employed to deliver material to hopper 38 at a full flow rate. Unshown feeding means may be employed if desired to deliver material at a dribble feed rate to the weigh hopper.

To deliver a second material to weigh-hopper 38, an additional feeder 60 is provided for and may be of the same construction as feeder 24, as shown in FIG. 1. Accordingly, the parts of feeder 60, which are the same as the parts of feeder 24, have been designated by like reference characters suffixed with the letter *a*. Unshown dribble feed apparatus may be provided for the second ingredient as mentioned in connection with feeder 24. In general, it will be appreciated that any suitable arrangement of feeding may be employed.

As shown in FIG. 1, weigh-hopper 38 is provided with a discharge gate 66 for controlling the discharge of material through the open bottom of the hopper by gravity. Gate 66 is opened and closed by a suitable fluid motor 68. A valve 70 actuated by a solenoid 72 controls the supply and exhaust of fluid for operating motor 68.

With continued reference to FIG. 1, a pivotally mounted catch gate 73 is interposed between feeder 24 and hopper 38. A suitable fluid motor 74 swings gate 73 about its pivot axis between its full line and dotted line positions to respectively permit and interrupt delivery of material from feeder 24. A valve 75 actuated by a solenoid 76 controls the supply and exhaust of fluid for operating motor 74. By operating solenoid 76, motor 74 is actuated to cause gate 73 to open, permitting feeder 24 to deliver material to hopper 38.

Feeder 60, as shown in FIG. 1, is also provided with a catch gate and fluid motor operator of the same construction as that just described for feeder 24. Accordingly, the catch gate and catch gate operator structure for feeder 60 has been identified with like reference numberals suffixed by the letter *a*, as shown.

A suitable lever system may be provided for supporting hopper 38 and is schematically shown in FIG. 1 to comprise a fulcrumed lever 80 which is pivotable about an axis provided by a knife edge and fulcrum assembly 82. Hopper 38 is pivotally suspended from lever 80 by a suitable knife edge assembly indicated at 84. On the side of the knife edge assembly 82 opposite from hopper 38, lever 80 is operatively connected to the input side of a suitable force transducer which may be a load cell indicated at 86. Load cell 86 may be of the conventional silicon or resistance strain gauge type and is excited by a suitable D.C. power supply source indicated at 88 in FIG. 2. Load cell 86, of course, may be connected to any suitable operative scale or lever part, which moves in proportion to the weight of delivered material. Alternatively, it will be appreciated that in place of the lever and load cell arrangement shown in FIG. 1, hopper 38 may be supported directly on a pluarlity of load cells which are preferably of the strain gauge type. Both load cell arrangements are conventional and well known.

As shown in FIG. 1, the weight-representing, analog output signal voltage of load cell 86 is supplied to a signal conditioning, processing and read-out circuit generally indicated at 89. As will be described in greater detail later on, circuit 89 provides a digital read out in visual form, printed form, or both. Circuit 89 also supplies an analog signal voltage, which is proportional to the weight of material delivered to hopper 38, to an analog weight control circuit generally indicated at 90.

The analog weight control circuit 90 is preferably the same as that described in the above-mentioned U.S. Pat. application Ser. No. 658,229 (now U.S. Pat. No. 3,528,518). In brief, it has a comparator network or module 93 that compares the scale output signal — which is developed by load cell 86 and which represents the weight of material delivered to scale hopper 38 — with a pre-set weight selection signal voltage. The weight selection signal voltage is developed by a weight selection device or circuit 94 and represents the desired or pre-selected amount of material to be delivered to hopper 38. In response to this signal comparison, comparator network 93 produces an error signal which is operative upon reaching a predetermined value to perform the desired functions in a batching operation. More specifically, circuit 90, in response to the above-mentioned error signal, will control the operation of motor 32 and 32*a* and solenoids 76, 76*a*, and 72 to provide the following sequence of operation:

Motor 32 is first energized to start operation of feeder 24 and the catch gate 73 is opened, thus allowing material from feeder 24 to be delivered to hopper 38. The load cell developed, weight-representing signal voltage is compared with the pre-set signal voltage from circuit 94. When the desired amount of the first material is delivered to hopper 38, circuit 90 responds to the comparison-produced error signal to de-energize motor 32 and to close catch gate 73, thus interrupting delivery of the first material to hopper 38. Motor 32*a* is then energized to start operation of feeder 60, and catch ate 73*a* is opened, thus permitting material from feeder 60 to be delivered to hopper 38. At the same time, the weight selection circuit 94 supplies to circuit 90 a second pre-set signal voltage which is proportional to the desired amount of the second material to be delivered to hopper 38. This second pre-set signal voltage is compared with the load cell-developed, weigh-representing signal to produce the above-mentioned error signal, and when the error signal again reaches a predetermined magnitude, circuit 90 de-energizes motor 32a and closes catch gate 73a, thus stopping operation of feeder 60 and interrupting the flow of material from feeder 60 to hopper 38. As fully described in co-pending application Ser. No. 658,229 (now U.S. Pat. No. 3,528,518), circuit 90 is programmed to operate solenoid 72 for opening discharge gate 66 and thus discharging the load accumulated in hopper 38.

Weight selection circuit 94 may be of the same construction as that described in the above-identified U.S. Pat. application Ser. No. 658,229 (now U.S. Pat. No. 3,528,518).

Figure 2:
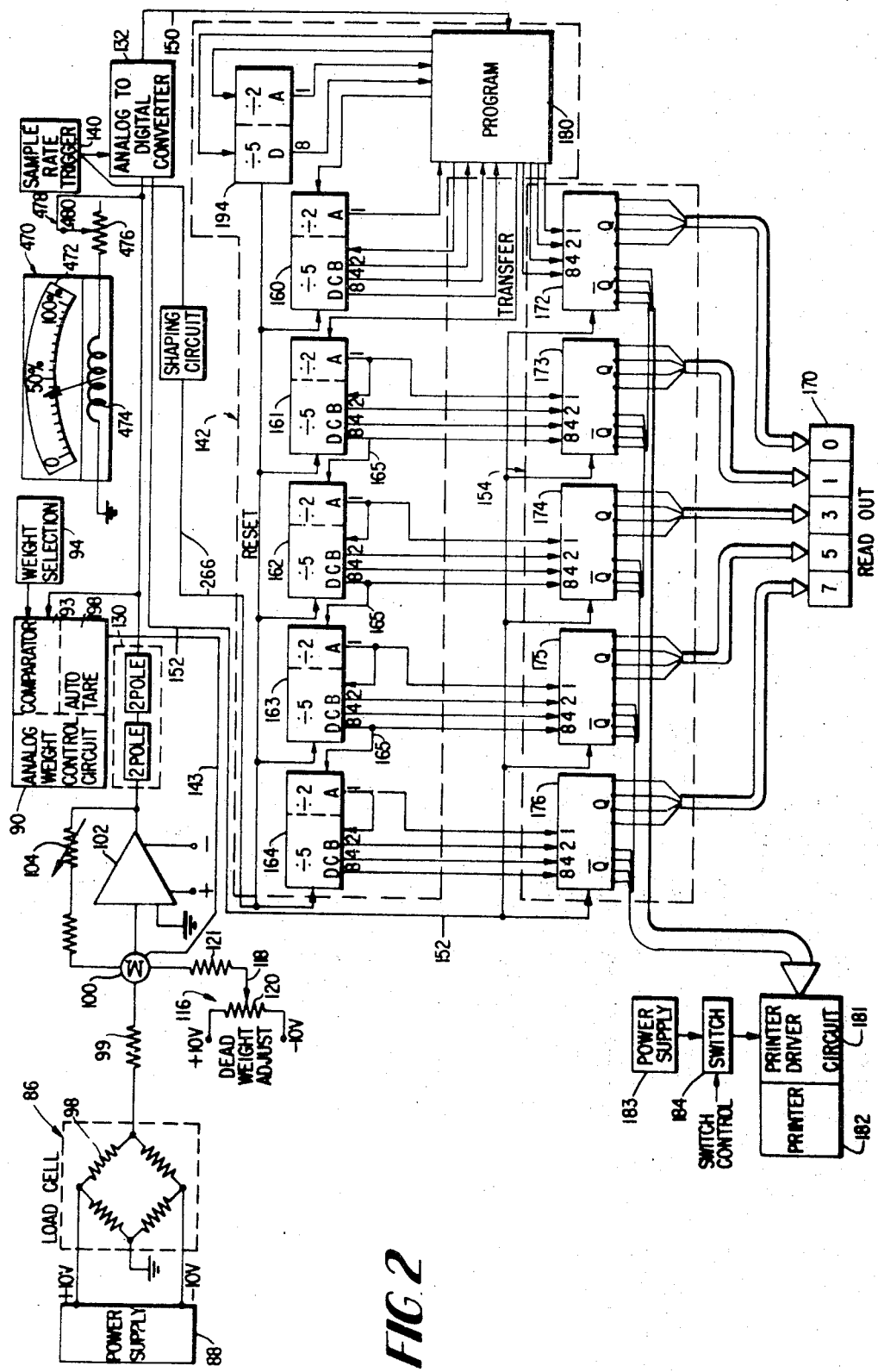
FIG. 2 is a partially functional, schematic diagram of the electrical weighing circuit shown in FIG. 1.

Referring to FIG. 2, load cell 86 conventionally comprises a bridge 98 having its output connected through a summing resistor 99 to a summing junction 100 for a signal conditioning, operational amplifier 102. The power supply source 88 is connected across the input terminals of the load cell bridge 98 as shown. A variable feedback resistor 104 couples the output signal voltage of amplifier 102 back to junction 100 to provide a span adjustment for the voltage range impressed upon the circuit. Operating power for amplifier 102 may be derived from any suitable source.

A dead weight tare adjustment is provided by a potentiometer 116 having a moveable wiper or arm 118 which is adjustable along a resistor 120. The voltage impressed on wiper 118 is supplied through a summing resistor 121 to junction 100. The load cell output signal voltage and the dead weight potentiometer signal voltage will be opposite in sign. Wiper 118 is adjusted to offset or tare out the weight of scale parts acting on load cell 86 to thereby provide a zero amplifier input voltage signal condition at junction 100 when hopper 38 is empty. Thus, the algebraic summation of signals at junction 100 will be closely proportional to the amount of material delivered to hopper 38. Amplifier 102 together with its summing junction and resitor summing network form a part of circuit 89. Amplifier 102, together with its summing junction and resistor summing network, may be in the form of a printed circuit on a printed circuit card. The remaining components and circuits or networks in circuit 89 may also be modularized and formed on printed circuit cards.

As shown in FIG. 2, the additional modules making up circuit 90 include a filter 130, an analog-to-digital converter 132, and components of a counting and memorizing circuit which will be described detail deatil later on.

With continued reference to FIG. 2, the amplified output signal voltage of amplifier 102 is supplied to filter 130 which filters out any A.C. component that may be superimposed on the D.C. signal. Desirably, filter 130 is of the low pass type having good frequency and time response characteristics to develop a filter output signal which is substantially free of A.C. components that might interfere with the trouble free operation of circuit 89. Preferably, filter 130 is a four-pole low pass filter that is made up by connecting two two-pole low pass filters in series. Each of the two-pole filter preferably is of the form described in pending application Ser. No. 854,994 filed on Sept. 3, 1969 (now U.S. Pat. No. 3,631,547) for Electrical Filters for Weighing System Circuits and assigned to the assignee of this application.

The amplified and conditioned, load cell-developed signal voltage at the output of filter 130 is applied to the input of the analog-to-digital converter 132. Converter 132 is of any suitable, appropriate form for producing a digital representation that is related to the level of the weight-representing analog signal voltage applied to the input of the converter. In this embodiment, the digital representation is in the form of a recurrent, fixed frequency (i.e., equal time separation between pulses) pulse stream or train in which the number of pulses in the stream is proportional to the level of the weight-representing analog signal voltage at the time when the analog signal is sampled.

A sample rate trigger circuit 140 produces a recurrent trigger signal which is applied to converter 132. In response to each trigger signal, converter 132 samples the weight-representing analog signal which is supplied to it by filter 130. Converter 132 translates each sampled analog signal into a series of pulses of equal time separation, and, as mentioned above, the number of pulses in each series will be proportional to the voltage level of the weight-representing analog signal. The pulses in each series are serially routed through from the output of converter 132 to a multi-decade BCD (Binary Coded Decimal) counter circuit generally indicated at 142 in FIG. 2. In this embodiment, the range of converter 132 is, by way of example, zero to 10,000 pulses.

At the end of each recurrent, weigh-representing pulse train converter 132 is conventionally equipped to supply a latching signal over line 152 to a latching network 154. Latching network 154, as will be described in greater detail later on, is connected to the output of counter circuit 142, and when the latching signal is received from converter 132 it latches in and thereby memorizes the BCD output of counter circuit 142. It will be appreciated that the number of converter pulses loaded into counter circuit 142 at this time will be substantially proportional to the level of the analog signal supplied by filter 130 at the time when it was sampled The sample rate trigger circuit 140 may also be connected by a line 266 to counter circuit 142 to supply a reset signal that resets the counter circuit to zero at the beginning of each sampling or conversion period.

Trigger circuit 140 may be of any suitable appropriate form and it may be incorporated as part of converter 132. One form of trigger circuit provides a saw-tooth like signal voltage by cyclically charging and discharging a capacitor. The repetition rate of the saw-tooth signal voltage will determine the rate at which the weight-representing analog signal voltage is sampled.

Counter circuit 142 comprises a series of conventional BCD electronic decade counters 160, 161, 162, 163 and 164 each having a four-bit 8-4-2-1 BCD output and respectively representing the units, tens, hundreds, thousands and tens of thousands digits in a weight-indicating, multi-digit decimal number to be displayed by a visual, digital translator and display device 170. Counter 160 performs dividing functions and is advantageously a monolithic type SN 7490 having a divide-by-two stage and divide-by-five stage. The BCD output pins of counter 160, as well as the BCD output pins of counters 161–164, are respectively designated by the reference characters A, B, C and D. The binary weights assigned to pins A, B, C and D for each counter respectively are 1, 2, 4 and 8 as shown.

To cause this type of counter to operate as a BCD counter, the A output pin (weight of 1), which is the output of the divide-by-two stage, is connected by a jumper to the input pin of the divide-by-five stage to transfer the output of the divide-by-two stage into the divide-by-five stage.

Figure 3:
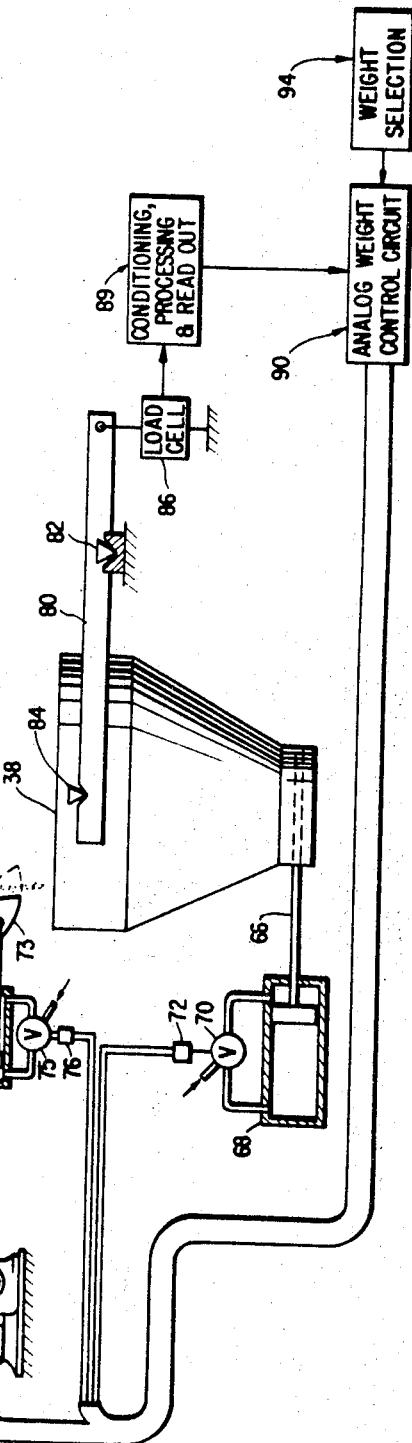
FIG. 3 is a BCD truth table showin the logic states for the counters illustrated in FIG. 2.

The truth table of BCD count sequence for each of the counters 160–164 is shown in FIG. 3. From this table it is clear that for each pulse supplied to the divide-by-two stage of counter 160, the signal state at pin A will change. The counter will automatically reset at the 10th pulse.

Counters 161–164 advantageously are the same as counter 160 and are connected as shown so that each performs a divide-by-10 function. For the type SN 7490 counter this is accomplished by connecting the D output pin of counter 161 to the divide-by-two stage input of counter 162, by connecting the D output pin of counter 162 to the divide-by-two stage input of counter 163, and by connecting the D output pin of counter 163 to the divide-by-two stage input of counter 164. With these connections, each of the counters 161–163 will supply the count of 1 to the next succeeding counter for every 10 counts coming into the counter.

It will be appreciated that the number of counters employed in circuit 142 will depend upon the number of decades that are desired in the number to be displayed. The input and the output connections for counter 160 and input connection for counter 161 will be described shortly.

Still referring to FIG. 2, latch network 154 comprises a series of BCD data word storage or memory latches, 172, 173, 174, 175 and 176, one for each of the counters 160–164. Latches 172–176 advantageously are of the four-bit quad type SN 7475, each having four storage devices for storing a four-bit data word and the complement thereof. For this purpose each of the four storage devices in each latch has a Q to $\bar{Q}$ output as indicated. Each storage device also has data bit input pin and a memory or latch pin. The data words to be stored in latches 172–176 are supplied by counters 160–164 respectively. The weights of the binary bit positions at the output of the latches are as shown. The logical states correspond to the truth table show in FIG. 3.

For the foregoing type of latch, the latching signal line 152 is connected to the latch pins of each storage device in latches 172–176. When converter 132 supplies the proper logical state on line 152, whatever binary states that are present on the data input pins of latches 172–176 will be transferred to and stored on the Q output pins of the latches, and the complements will be stored on the $\bar{Q}$ output pins.

As shown, the A, B, C and D output pins of counter 161 are connected in parallel to the four data input pins of latch 173. Similarly, the A, B, C and D output pins of counter 162 are connected in parallel to the data input pins of latch 174, the output pins A, B, C and D of counter 163 are connected in parallel to the data input pins of latch 175, and the four output pins A, B, C and D of counter 164 are connected in parallel to the four data input pins of latch 176. The connections between counter 160 and latch 172 will be described shortly.

The information in counters 161–164 is transferred in parallel to latches 173–176 respectively. Selected information from the output of counter 160 will also be supplied in parallel to latch 172 in a manner to be explained in detail later on. Latches 172–176 memorize this information when the proper latching logical state is supplied by converter 132 as previously described.

The output pins of each of the latches 172–176 are connected in parallel to one module in device 170. In this embodiment device 170 will have five modules, one for each of the latches 172–176. Device 170 may be of any suitable, conventional form for accepting a BCD input at a relatively low voltage level and for generating at each module the corresponding decimal output 0 through 9. The modules are grouped to provide the multi-digit display as illustrated in FIG. 2. One type of device 170 is Sigma 7 Model 32, manufactured by Sigma Instruments, Inc. of Boston, Mass. In converting back to decimal form, the truth table in FIG. 3 may be utilized to determine the number that device 170 will display in response to the data information latched on the Q output pins of latches 172–176. Considering the units module of device 170 and its associated latch 172, for example, the numeral "1" will be displayed when the memorized data word is 0001. If the memorized data word is 0010, the numeral "2" will be displayed in the units module of device 170. If the memorized date word at the output of latch 172 is 0101, the numeral "5" will be displayed by the units module of device 170, and so on. A number of fixed zero display modules may be added to device 170 to display larger digit numbers.

Counters 160–164 may be provided on one or more printed circuit cards. Likewise, latches 172–176 may be provided on one or more printed circuit cards.

Advantageously, the $\bar{Q}$ output pins of each of the latches 172–176 are connected to a printer solenoid and solenoid driver circuit 181 of suitable form. Circuit 181 contains the solenoids for operating type in a printer 182. The data words memorized by latches 172–176 are operative to select those solenoids that will, upon energization, actuate printer 182 to print out the weight in decimal form. Power for the printer solenoids is supplied from a suitable source 183 through a switch 184. Switch 184 may be actuated by a selectively applied switch control signal to electrically connect source 183 to circuit 181. The power supplied from source 183 will energize those printer solenoids that were selected for energization by the BCD data from latches 172–176.

As will be described in detail shortly, a program circuit 180 (FIG. 2) provides the circuit connections for counters 160 and 161, latch 172 and a pre-stage divider 194 to selectively enable the device 170 to display the counts in increments of ones, twos, or fives. Operation of the circuit thus far described will now be reviewed.

After the desired weights of the materials to be delivered to hopper 38 are selectively pre-set in the weight selection circuit 94, control circuit 90 is activated to start feeder 24 first, and gate 73 will be opened to begin the delivery of the first material to hopper 38. As material is delivered to hopper 38, the output signal of load cell 86 increases. The load cell signal voltage is conditioned by amplifier 102 and filtered by filter 130, and from filter 130 it is applied to circuit 90 where it is continuously compared with the pre-set signal voltage (representing the desired weight) supplied by the weight selection circuit 94. At the same time, the conditioned and filtered load cell signal voltage is applied to the input of converter 132 where it is continually sampled at a pre-selected repetition rate in the manner previously described. The frequency at which the samples of the analog signal voltage are taken will be determined by the frequency of the triggering signal supplied by circuit 140.

Each time circuit 140 applies a triggering signal to converter 132, converter 132 responds by sampling the weight-representing analog signal voltage. Thus for each sample converter 132 will produce a series of pulses in which the number of pulses is proportional to the voltage level of the analog signal supplied by filter 130. The converter-produced pulses are routed by line 150 to counter circuit 142 and will be loaded into the decade counters, starting with counter 160 and then progressing to each successive decade counter as transfer operations are performed. At the completion of each weight-representing pulse train, converter 132 supplies a latching signal over line 152 to cause latches 172–176 to memorize whatever data information that was loaded into counters 160–164 by the weight-representing train of pulses from converter 132. The latch signal thus marks the end of the analog-to-digital conversion, and the BCD data information equivalent to the sampled analog filter output voltage will be stored on the output pins of latches 172–176 as previously described. The BCD data information latched in on the ouput pins of latches 172–176 will be supplied to display device 170 to cause device 170 to display the weight of the material delivered to hopper 38 as a multi-digit decimal number.

At the termination of the triggering signal, counters 160–164 are responsive to the trailing edge of the triggering signal to reset to zero. Latches 172–176 are self-clearing in that previously memorized information will be erased or removed by the transfer and memorization of new information. In this manner, the weight-representing analog voltage from the output of filter 130 is periodically sampled at a pre-set rate and read out in a visual display by operation of display device 170.

When the desired amount of the first material is delivered to hopper 38 by feeder 24 as determined by the electrical comparison of the pre-set signal voltage from circuit 94 with the analog signal voltage from the ouTput of filter 130, circuit 90 automatically stops feeder 24 and closes gate 73. Having thusly stopped the delivery of the first material to hopper 38, circuit 90 then automatically starts feeder 60 and opens gate 73a. As a result, delivery of the second material is initiated.

Circuit 90, as described in the previously identified application Ser. No. 658,229, has an auto tare network or module 198 which automatically memorizes the weight of each material delivered to hopper 38 in a given batch formula. At the end of the delivery of the first material the memorized signal voltage will be equal in magnitude to the weight-representing signal at the output of filter 130.

At the end of the delivery of the first material the memorized, auto tare signal voltage, which is supplied by network 198, is applied to comparator network 93 along with the output signal voltage from filter 130 and the next pre-set signal voltage developed by circuit 94 and representing the desired weight of the second material to be delivered to hopper 38. The polarities of these three signals are such that in algebraically summing the three signals at comparator network 93, the auto tare signal effectively cancels the signal voltage from filter 130. Thus, an unbalanced voltage condition represented by the second pre-set signal voltage from circuit 94 will be impressed on comparator network 93 in preparation for the delivery of the second material.

When feeder 60 is actuated and gate 73a is opened, the second material is delivered to hopper 38, thus increasing the output signal voltage of load cell 86 by a corresponding magnitude. Since this load cell signal represents the total weight of materials delivered to hopper 38, device 170 will display the total weight. Instead of applying the above-mentioned auto tare signal voltage to comparator network 93, at the end of the delivery of each material, the auto tare signal voltage may alternately be applied to summing junction 100 as indicated at 143 in FIG. 2 at the input of amplifier 102. The polarity of the auto tare signal voltage will be opposite to that of the load cell signal voltage. Thus, by algebraically summing the auto tare signal voltage along with the load cell signal voltage and the other signal voltages at junction 100, the output of amplifier 102 will reduce to zero when the auto tare signal voltage is applied to junction 100 at the end of the delivery of each material to hopper 38. It is clear that the auto tare signal voltage will be applied to junction 100 only after the material is delivered to hopper 38. Thus, upon delivery of the above-mentioned first material to hopper 38, the auto tare signal voltage, having a value equal and opposite in size to the load cell signal voltage, will be applied to junction 100. As a result, the output of filter 130 reduces to zero, and the analog signal voltage that is applied to converter 132 as the next material is delivered to hopper 38, will be proportional to the weight of the next material and not the total weight of materials in hopper 38. In this manner device 170 and printer 182 will non-accumulatively read out the weight of each material delivered to the hopper, rather than the total weight of the delivered materials.

Referring back to the batching operation of the system shown in FIG. 1, it is clear that when the desired weight of the second material is delivered to hopper 38, the comparison of signals at comparator network 93 causes feeder 60 to stop and gate 73a to close, thereby terminating the delivery of the second material to the hopper. Discharge gate 66 may now be opened to discharge the contents in hopper 38.

In the system thus far described it is apparant that circuit 89 is readily adaptable to provide a digital read out for a scale having a 10,000 pound capacity because the capacity of converter 132 is 10,000 pulses. Thus, each weight-representing pulse in the pulse stream produced by converter 132 will be equivalent to one pound of material in hopper 38. Each of the converter pulses loaded into counter circuit 142 and memorized by latch network 154 is capable of causing the digital display in each decade of device 170 to count in increments of one. Therefore, device 170 may display a count up to 10,000 in increments of one.

Application of an analog-to-digital read-out circuit to load cell scales of different capacities, however, presents various complications owing to limitations imposed by the analog-to-digital converter and the necessary correlations between the analog-to-digital converter and the read-out device (visual, printed or other form). Each converter will only produce a maximum number of pulses and each pulse will be proportional to one part of a predetermined voltage range. In the example given, converter 132 produces a maximum count of 10,000 pulses in response to an analog voltage level input of 10 volts. It therefore is necessary for a gross load of 10,000 pounds in hopper 38 to produce a signal voltage of 10 volts at the input of converter 132. This voltage level is achieved by the span adjustment at the variable resistor 104.

If the same amplifier span and the same digital read-out circuit with the same equipment is applied to a 5,000 pound scale, a gross load of 5,000 pounds would apply 10 volts to the input of converter 132, and converter 132 would consequently produce a pulse count of 10,000 pulses to cause a read-out of 10,000 pounds instead of the desired 5,000 pounds.

In the past, the foregoing problem was avoided wherever possible by utilizing only a part of the available span at amplifier 102.

For example, the span for a 5,000 pound scale would be adjusted downward to 5 volts to provide 5 volts at the input of converter 132 for a gross load of 5,000 pounds. This solution also has its drawbacks as compared with a system that is capable of utilizing the full span or maximum gain available.

First, the signal-to-noise ratio will decrease because the gain at amplifier 102 is reduced to a value less than that which is available. In the example given, the gain is one-half of that which is available. The signal-to-noise ratio will consequently decrease since the line and circuit noise error is not linear with respect to the gain.

Second, 5 volts will now be resolved into 5,000 parts or pulses. Consequently, the full capacity of the 10,000 pulse analog-to-digital converter will not be utilized. The accuracy and resolution of the system will be degraded. These are some of the disadvantages, and in addition to them, digital read-out type weighing systems proposed prior to this invention have a number of other shortcomings.

For example, prior systems do nor provide the capability of optionally counting in different displayed increments such as ones, twos, or fives. As previously mentioned it is sometimes desirable not to display the total number of converter pulses.

For example, displaying the weight-representing, converter-produced pulses in increments of twos or fives instead of ones, tends to improve the stability of the visual read-out. If, for instance, the read-out is alternating between two pulses of counts, the visual diplay will flicker when counting by displayed increments of ones. If only every other pulse or count is displayed (i.e., counting by increments of twos), the chances of observing the alternation will be reduced.

According to this invention, program circuit 180 overcomes the foregoing problems in a manner now to be described. The connections in circuit 180 perform two desirable functions. First, it provides the capability of dividing the pulse train produced by converter 132. Second, it provides the capability of counting by series of different displayed increments. The following examples of the program circuit connection are given:

1. A read-out of a 10,000 pound gross weight counting in displayed increments of ones (FIG. 4).
2. A read-out of a 10,000 pound gross weight counting in displayed increments of twos (FIG. 5).
3. A read-out of a 10,000 pound gross weight counting in displayed increments of fives (FIG. 6).
4. A read-out of 5,000 pound gross weight counting in displayed increments of ones (FIG. 6A).
5. A read-out of a 50,000 pound gross weight counting in displayed increments of fives (FIG. 7).

Advantageously, each of the program circuit connections for the foregoing conditions is provided on a separate printed circuit card. Accordingly, five circuit cards 180a (FIG. 4), 180b (FIG. 5), 180c (FIG. 6), 180d (FIG. 6A) and 180e (FIG. 7) are shown for the five conditions mentioned above.

Figures 4, 5:
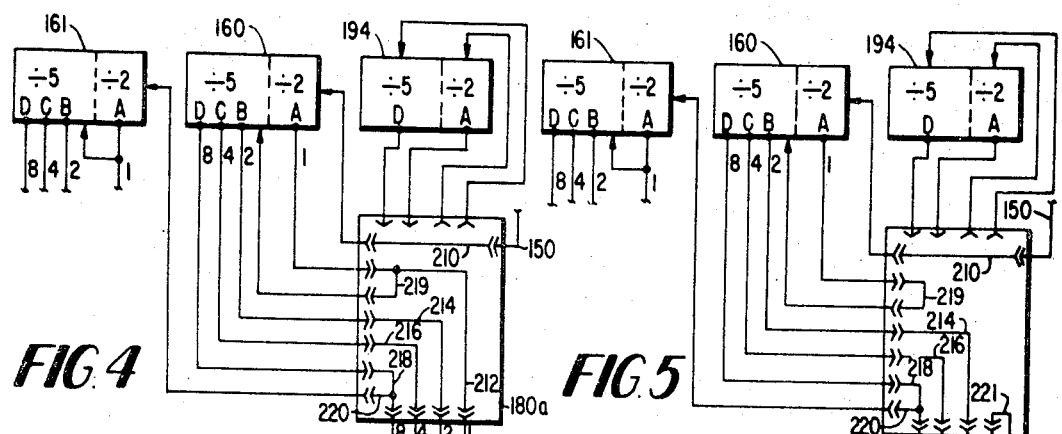
FIG. 4 illustrates the counter program circuit connections for reading out a gross weight of 10,000 pounds by counting in displayed increments of ones.
FIG. 5 is a schematic of the counter program circuit connections for reading out a gross weight of 10,000 pounds by counting in displayed increments of twos.

Referring to FIG. 4, the program connections provided on card 180a for reading out a 10,000 pound gross weight by counting in displayed increments of ones, is as follows:

Line 150 is connected by a conductor 210 to the pulse input terminal or pin of the divide-by-two stage of counter 160; the data output pin A at the divide-by-two stage of counter 160 is counnected by a conductor 212 to the corresponding weight-of-one data input pin at latch 172; the data output pin B at the divide-by-five stage of counter 160 is connected by a conductor 214 to the weight-of-two data input pin of latch 172; the data output pin C at the divide-by-five stage of counter 160 is connected by a conductor 216 to the weight-of-four data input terminal of latch 172; and the data output terminal D at the divide-by-five stage of counter 160 is connected by a conductor 218 to the weight-of-eight data input terminal of latch 172.

Circuit card 180a has two additional circuit connections indicated by conductors 219 and 220. Conductor 219 connects output pin A of counter 160 to the data input pin of the divide-by-five stage in counter 160, thus transferring the output of the divide-by-two stage to the input of the divide-by-five stage. Conductor 220 connects the data output pin D of counter 160 to the data input pin of the divide-by-two stage in counter 161 to thus provide a transfer of data to counter 161.

With the circuit connections shown in FIG. 4, the binary data bits on output pins A, B, C and D will be transferred in parallel to the latch data input pins of corresponding weights. These connections together with the direct connection from converter 132 to the input pin of the divide-by-two stage of counter 160 and the transfer of data from pin A of counter 160 to the input of the divide-by-five stage in counter 160 will cause the units module of device 170 to advance the displayed count by one for each pulse supplied by converter 132. Thus, the parts or pulses will be totaled and displayed by counting in displayed increments of ones.

Referring now to FIG. 5, the circuit for displaying a gross weight of 10,000 pounds counting in displayed increments of twos, is the same as that shown in FIG. 4 except that conductor 212 has been removed. In addition, the weight-of-one data input terminal of latch 172 is tied to ground as indicated at 221. Since the remaining circuit connections on circuit card 180b are the same as those on card 180a, like reference numerals have been applied to designated the conductors on card 180b.

Alternatively, the weight-of-one data input pin of latch 172 may be connected to a voltage source for supplying a logical 1, depending upon the logic that is utilized.

With the circuit connections shown in FIG. 5, it will be appreciated that only counts corresponding to every other analog-to-digital converter pulse is supplied to and memorized by latch 172. Since the data bit information on output pin A or counter 160 is not transferred to latch 172 and since the weight-of-one data input pin of latch 172 is grounded, the state on the corresponding output pin of latch 172 will not change states. Thus, for example, the display in the units module of device 170 will be zero, two, four, six and eight.

Figures 6, 6A:
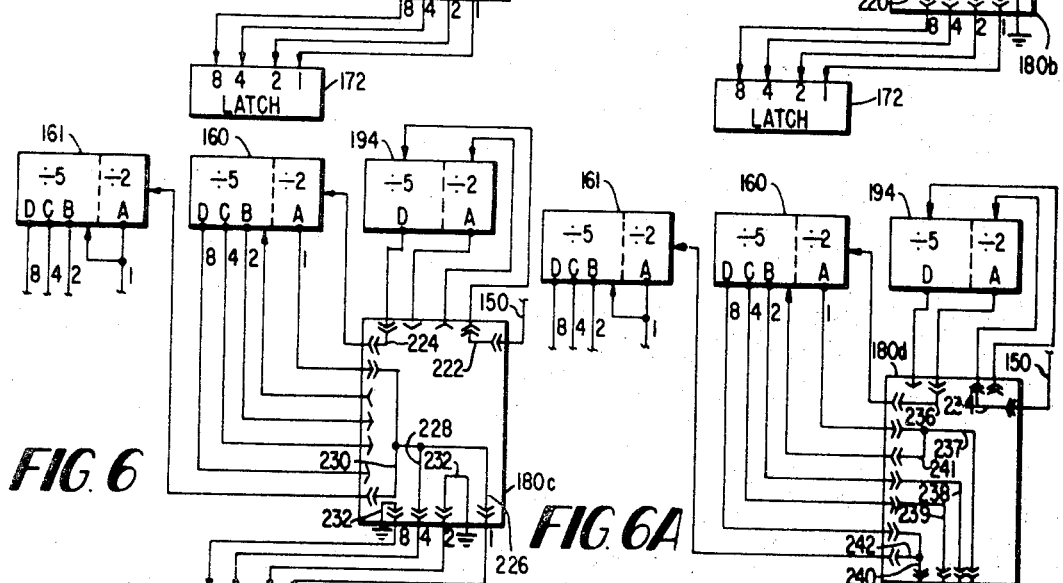
FIG. 6 is a schematic of the counter program circuit connections for reading out a gross weight of 10,000 pounds by counting in displayed increments of fives.
FIG. 6A is a schematic of the counter program circuit connections for reading out a gross weight of 5,000 pounds by counting in displayed increments of ones.
Figure 7:
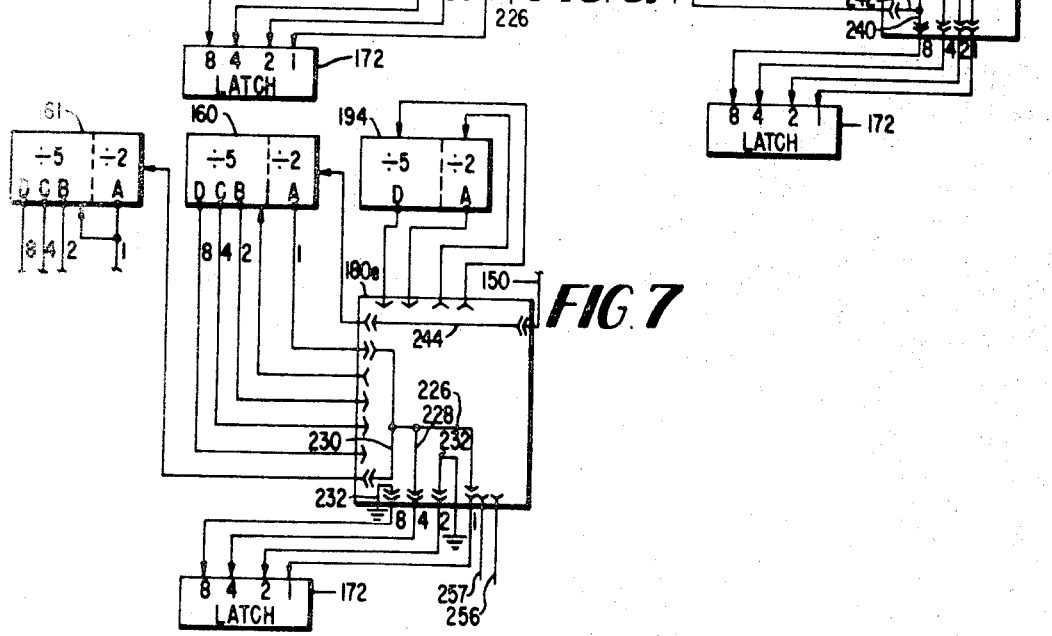
FIG. 7 is a schematic of the counter program circuit connections for reading out a gross weight of 50,000 pounds by counting in displayed increments of fives.

Referring to FIG. 6, the circuit connections that are made in circuit card 180c for displaying a gross weight of 10,000 pounds by counting in displayed increments of fives are as follows:

Line 150 is connected by a conductor 222 to the data input pin of the divide-by-five stage in the pre-stage divider 194. The D output pin at the divide-by-five stage of divider 194 is connected by a conductor 224 to the data input pin of the divide-by-two stage in counter 160. The data output pin A of the divide-by-two stage in counter 160 is connected by a conductor 226 to the weight-of-one data input terminal of latch 172. The data output pin A of counter 160 is also connected through a conductor 228 to the weight-of-four input pin of latch 172. In addition, the data output pin A of counter 160 is connected through a conductor 230 to the data input pin of the divide-by-two stage in counter 161. Both the weight-of-two data input pin and the weight-of-eight data input pin of latch 172 are connected to ground as indicated as 232. By supplying the weight-representing pulse stream of converter 132 to he input of the divide-by-five stage of divider 194 and by applying the output of the divide-by-five stage of divider 194 to the data input pin of the divide-by-two stage in counter 160, only one count will be transferred to the divide-by-two stage of counter 160 for every five counts or pulses applied to the input of the divide-by-five stage in divider 194. Thus, the divide-by-five stage of divider 194 effectively divides the incoming count by five. If, for example, converter 132 supplies a pulse train of 10,000 pulses to the divide-by-five stage of divider 194, only 2,000 counts will be transferred to the input of the divide-by-two stage in counter 160.

However, the A output pin at the divide-by-two stage in counter 160 is now connected by the circuit connections on card 180c to both the weight-of-one data input pin and the weight-of-four data input pin of latch 172. Thus for every fifth pulse supplied by converter 132, the logical state at the weight-of-one input pin and the weight-of-four input pin of latch 172 will change. The BCD data word transferred to and latched in at the data output pins of latch 172 will therefore be either 0000 or 0101. As noted from the truth table in FIG. 3, the data words 0000 and 0101 will be translated by device 170 respectively into zero and 5, so that the units module of device 170 will alternately display a zero and a five. If, for example, the display of the units module of device is at zero, no change will occur until the fifth of the first five pulses are supplied by converter 132. On the fifth pulse, the logical states at the weight-of-one data input pin and the weight-of-four data input pin of latch 172 will change concomitantly from a 0 to a 1, and if this information is memorized, the number displayed in the units module of device 170 will change from zero to five. It therefore will be appreciated that a gross weight of 10,000 pounds will be counted out by counting in displayed increments of fives.

In FIG. 6 it will be noted that the divide-by-five stage of counter 160 is effectively removed from the active circuit since no counts are supplied to it and since its three data output pins B, C and D are disconnected from the remainder of the circuit. The count transfer from counter 160 to counter 161 is effected by conductor 230, thus transferring the count on the A output pin of counter 160 to the data input pin of the divide-by-two stage in counter 161.

Referring to FIG. 6A, the circuit connections that are made in circuit card 180d for displaying a gross weight of 5,000 pounds by counting in displayed increments of ones is as follows:

Line 150 is connected by a conductor 234 to the data input pin of the divide-by-two stage in divider 194; the data output pin A at the divide-by-two stage of divider 194 is connected by a conductor 236 to the data input pin of the divide-by-two stage in counter 160; the data output pin A of counter 160 is connected by a conductor 237 to the weight-of-one data input pin of latch 172; the data output pin B of counter 160 is connected by a conductor 238 to the weight-of-two data input pin of latch 172; the data output pin C of counter 160 is connected by a conductor 239 to the weight-of-four data input pin of latch 172; the data output pin D of counter 160 is connected by a conductor 240 to the weight-of-eight data input pin of latch 172; the data output pin A of counter 160 is also connected through a conductor 241 to the data input pin of the divide-by-five stage in counter 160; and the D output pin of counter 160 is also connected through a conductor 242 to the data input pin of the divide-by-two stage in counter 161.

With the foregoing circuit connections on card 180d it will be appreciated that the divide-by-two stage in divider 194 is now operative to divide the converter-produced pulse train by two. As a result, only one count will be transferred to the divide-by-two stage of counter 160 for every two pulses applied by converter 132 to the input of the divide-by-two stage of counter 160. Furthermore, it is clear that the data output pins A, B, C and D will be connected in parallel to the corresponding data input pins of latch 172 similar to the connections shown in FIG. 4. Also the transfer of the count from the divide-by-two stage of counter 160 to the divide-by-five stage of counter 160 and the transfer of the count from the D output pin of counter 160 to the data input pin of the divide-by-two stage in counter 161 is the same as that shown in FIG. 4.

Accordingly, only every other converter-produced pulse is counted by the BCD counter circuit so that the logical states on the weight-of-one data input pin of latch 172 will change only on the application of every other converter-produced pulse. In other words, every other pulse supplied by converter 132 will cause the logical states at the data input pins of latch 172 to changes as follows: 0000 to 0001 to 0010 to 0011 to 0100 and so on. A gross weight of 5,000 pounds will therefore be counted by counting in displayed increments of ones.

Referring to FIG. 7, the circuit connections that are made in the printed circuit card 180e for displaying a gross weight of 50,000 pounds by counting in displayed increments of fives are the same as that shown in FIG. 6 except that conductors 222 and 224 have been replaced by a conductor 244 for directly connecting line 150 to the data input pin of the divide-by-two stage in counter 160. As a result, divider 194 is bypassed and is out of the active circuit. The remaining connections from counter 160 to latch 172 and to counter 161 are the same as that shown in FIG. 6. Accordingly, like reference numerals have been applied to designate like conductors on card 180e. In addition, the weight-of-two data input pin and the weight-of-eight data input pin of latch 172 are connected to ground as in card 180c. Counting will therefore be in displayed increments of fives, for the memorized data word on the output pins of latch 172 will either be 0000 or 0101. Thus, read-out will be displayed in increments of fives, but as distinguished from the circuit shown in FIG. 6, each pulse produced by converter 132 will be counted, and each counter pulse will have a corresponding read-out value of five pounds since each count, upon being memorized, will cause the units module in device 170 to increase in 5 pound increments. For the five-decade counter shown, therefore, an input of 10,000 pulses will produce a display of 50,000 pounds.

Advantageously, circuit cards 180a–180e are interchangeable with each other so that a selected circuit card may be mounted in a suitable unshown socket assembly that provides the necessary inter-connections to the other, previously mentioned printed circuit modules and other portions of the overall circuit, as required. With the three 10,000 pound circuit cards 180a, 180b, and 180c, the circuit 89 may selectively and conveniently be converted to count in displayed increments of ones, twos or fives. For example, if card 180a is in circuit 89 and it is later desired to count by displayed increments of twos instead of ones, it is only necessary to replace card 180a with card 180b. If it is desired to count and display 10,000 pounds by displayed increments of fives instead of ones or twos, then card 180c is placed on the socket assembly in place of either card 180a or 180b.

In addition to the convenience that is afforded by the foregoing arrangement, improved stability in the read-out may be achieved by counting in displayed increments of twos or fives instead of ones. If the converter pulse train output is alternating between two pulses, for example, the alternation will be observed in the form of a flickering display when circuit card 180a is being used. If card 180a is replaced with either card 180b or 180c, the chances of observing the alternation will be reduced. As a result, a more stable reading is achieved.

Counting in displayed increments greater than ones, such as twos or fives, enables the same 10,000 pulse converter (i.e., converter 132) to be utilized for reading out gross weights which numerically exceed the maximum number of pulses that the analog-to-digital converter is capable of producing. Consider, for example, the application of circuit 89 with the 10,000 pulse converter. It readily matches a 10,000 pound gross weight scale, for each converter produced pulse will be the equivalent of one pound. In accordance with the present invention, the same circuit 89 with the 10,000 pulse converter may optionally be applied to a 50,000 pound gross weight scale simply by replacing card 180a with card 180e. In addition, the same high gain of amplifier 102 will be utilized.

If it is desired to apply circuit 89 with its 10,000 pulse converter to a 5,000 pound gross weight scale, it is only necessary to place circuit card 180d in the circuit in place of any card that may already be in the circuit. If converting from a 10,000 pound gross weight to a 5,000 pound gross weight, it will be noted that the same high span that was provided at amplifier 102 for the 10,000 pound gross weight is utilized for the 5,000 pound gross weight. In this embodiment, therefore, a gross weight of 5,000 pounds will produce an analog voltage level of 10 volts, thereby avoiding the objectionable adjustment downward of the available gain as required in conventional systems.

With this invention, therefore, the amplifier gain is maintained at its maximum to maintain a high signal-to-noise ratio. Furthermore, the full capacity of converter 132 will be utilized, namely 10,000 pulses for 5,000 pounds so that each converter output pulse will be produced by a relatively high increment of the analog signal.

Furthermore, in converting, for example, from a 10,000 pound gross weight to a 5,000 pound gross weight, the counted parts (i.e., the parts counted in counters 160–164) will only be one-half of the pulses produced by converter 132. In comparison, conventional systems will count all of the weight-representing, converter-produced pulses. By reducing the number of counted parts of pulses the system of this invention will provide greater accuracy and stability as compared with prior systems. Consider, for example, an error of one part in the pulse train produced by converter 132. In conventional systems this error will appear in the read-out. But by dividing at a pre-stage divider and thereby counting said every other part, the error of one part will not appear in the read-out.

From the foregoing, it is evident that the accuracy and resolution of the system of this invention is higher than that of the previously described conventional systems.

In place of circuit cards 180a–180e it will be appreciated that the desired connections in program 180 may be achieved by other means such as jumpers or patchcords, switches, relays, field effect transistors or electronic switches.

In FIG. 1 circuit 89, comprising amplifier 102, filter 130, converter 132, counter circuit 142, latch network 154, and the read-out devices 170–184, was described as applied to a batch weighing system. It will be appreciated, however, that circuit 89 of this invention has numerous other applications as in, for example, motion weighing systems in general, and particularly in vehicle or article weighing systems. A vehicle weighing system is illustrated in FIG. 8, wherein a suitable platform scale mechanism 300 supports a platform 302 for receiving a truck indicated at 304.

The scale mechanism 300 has an output lever 306 which is connected to load cell 86 in any appropriate, known manner. Load cell 86 is connected to summing junction 100 as previously described. The remainder of the conditioning and digital read-out circuit is the same as circuit 89 except for the addition of a tare circuit which will be described later on. Accordingly, like reference numerals have been applied to designate like components in conditioning and read-out circuit shown in FIG. 8.

Figure 8:
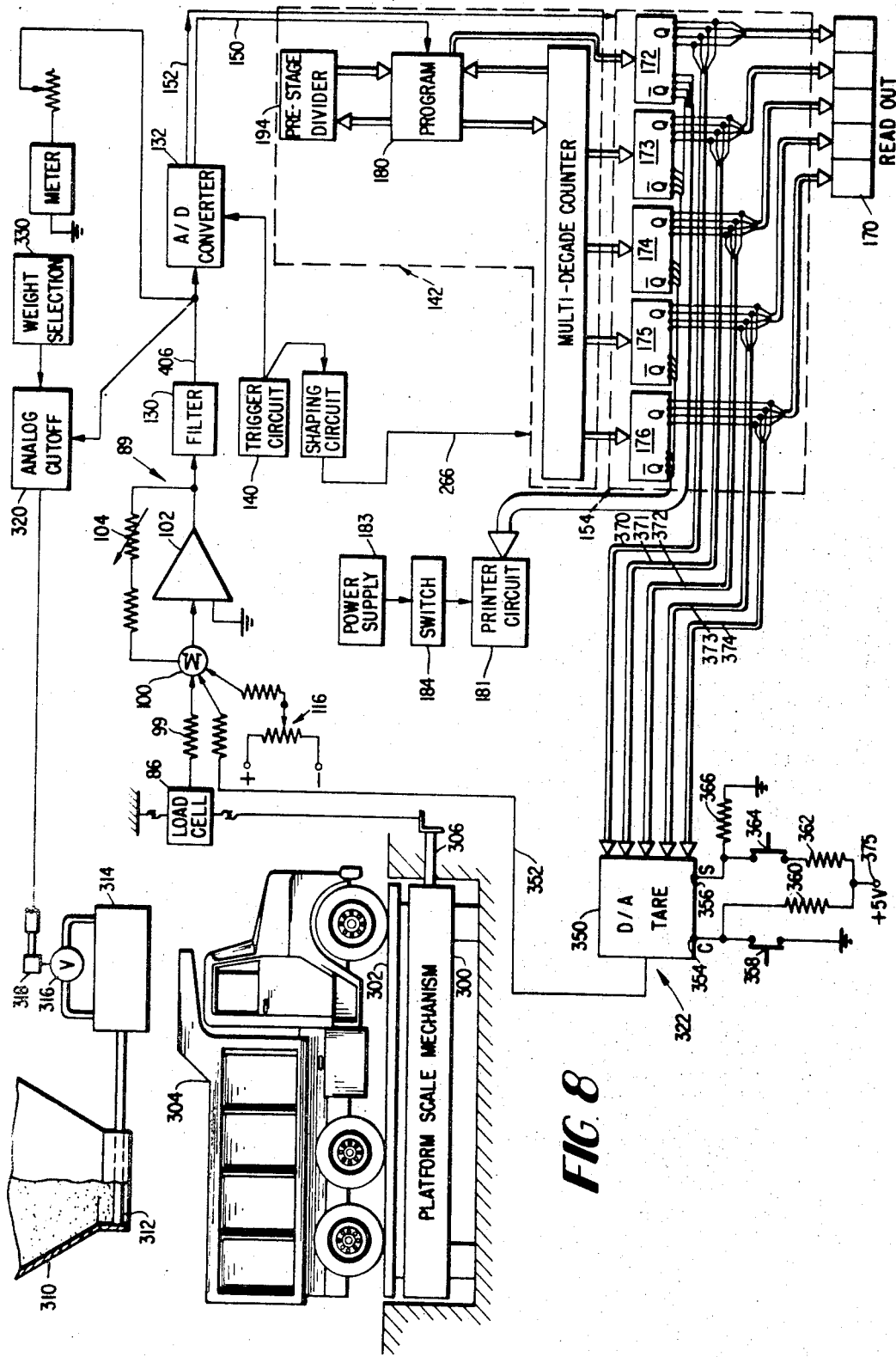
FIG. 8 is a schematic showing the application of the weighing and read-out circuit of this invention to a vehicle platform type scale and further showing a special tare circuit for taring out the load cell output signal voltage.

Instead of connecting scale mechanism 300 to a single load cell as illustrated in FIG. 8, it will be appreciated that platform 302 may be supported directly on a plurality of load cells which also are preferably of the strain gauge type. The summation of output voltages from such a plurality of load cells would be applied through a suitable circuit to summing junction 100.

In the system shown in FIG. 8, a storage hopper or bin 310 is provided for storing material to be delivered to the vehicle on platform 302. The open bottom of bin 310 is selectively closed by a discharge gate 312. Gate 312 is opened and closed by a suitable fluid drive motor 314. A valve 316 actuated by a solenoid 318 controls the supply and exhaust of fluid for operating motor 314. Solenoid 318 may be controlled by an analog cutoff circuit 320 which is essentially the same as part of circuit 90.

The system shown in FIG. 8 is operative to deliver a preselected amount of material from bin 310 to the vehicle 304 on platform 302. Briefly, the truck is placed on platform 302 and is weighed by circuit 89 in the manner previously described. A tare circuit generally indicated at 322 is then activated to tare out the weight of the truck on platform 302 by supplying an analog signal voltage to summing junction 100 which is equal and opposite in sign to the existing weight-representing load cell output voltage at junction 100. The load cell signal applied to summing junction 100 at this time represents the weight of the truck and any dead load of the scale mechanism applied to load cell 86.

The portion of the load cell output signal voltage representing any dead load that is applied by the scale mechanism to load cell 86 is tared out by the signal voltage developed by the dead weight potentiometer 116. The portion of the load cell output signal voltage representing the weight of the vehicle in platform 302 will now be tared out by the tare signal voltage developed by circuit 322. It therefore will be appreciated that the signal voltage applied by circuit 322 to summing junction 100 will cause the algebraic summation of signals at junction 100 to go substantially to zero. A balance signal voltage condition will therefore exist at the input of amplifier 102.

Thus by applying the tare signal from circuit 322 to summing junction 100, the level of the signal voltage at the output of amplifier 102 and consequently at the output of filter 130 goes substantially to zero, and this signal condition is applied to cut-off circuit 320 where it is electrically compared by a suitable comparator 326 (see FIG. 9) with a fixed, pre-set signal voltage representing the desired weight of material to be delivered to truck 304. The pre-set signal voltage is developed by a potentiometer 328 (FIG. 9) in a weight selection circuit and is applied through a suitable summing resistor to a summing junction 332 at the input of comparator 326. The output signal voltage of filter 130 also is applied to summing junction 332 through a suitable summing resistor. A 10 volt zener diode 334 is connected between summing junction 332 and the output of comparator 326. Comparator 326 comprises a suitable form of operational amplifier. The output of comparator 326 is connected to one terminal of a relay 336, and the other terminal of relay 336 is connected to a suitable 10 volt source as shown. This comparison and relay circuit is the same as that shown and described in the previously identified U.S. application Ser. No. 658,229 (now U.S. Pat. No. 3,528,518).

For the connections of zener diode 334 shown in FIG. 9, the polarity of the pre-set signal voltage developed by potentiometer 328 will be negative, while the polarity of the weight-representing signal voltage at the output of filter 130 will be positive in this example. Thus when the output of filter 130 is less than the pre-set signal voltage developed by potentiometer 328, the algebraic summation of the signals will be negative to reverse bias diode 334. When diode 334 is reverse biased it will hold the comparator output voltage at junction 338 at +10 volts. As a result, there will be no voltage drop across the operating winding of relay 336, and relay 336 will therefore be de-energized.

Still referring to FIG. 9, the operating circuit for solenoid 318 has been simplified and may basically comprise a selectively operated switch 340 and a set of normally closed contacts 342 of relay 336. Switch 340, contacts 342 and solenoid 318 are connected in series across a suitable power supply source indicated at 344.

From the foregoing it will be appreciated that when the magnitude of the pre-set signal voltage developed by potentiometer 328 exceeds the analog weight-representing signal voltage, a negative unbalanced signal condition will exist at junction 332 to maintain relay 336 de-energized. As a result, contacts 342 will be closed. Thus, when it is desired to deliver material to the truck 304 on platform 302, the operator closes switch 340 to energize solenoid 318 through contacts 342. Energization of solenoid 318 operates valve 360 to supply pressurized fluid to motor 314 in a manner to shift gate 312 to its opened position. Material in bin 310 will therefore descend by gravity into truck 304.

As material is delivered to the truck on platform 302, the output signal voltage of load cell 86 will correspondingly increase. Since the signal voltage representing the weight of the unloaded truck and any weight applied by the scale mechanism to load cell 86 is tared out at junction 100, the level of the signal voltage at the output of filter 130 will be closely proportional to the amount of material delivered to the truck. This filter output signal voltage is continuously compared with the pre-set signal voltage from circuit 330 at comparator 326.

When the desired amount of material is delivered to truck 304 on platform 302, the magnitude of the signal voltage supplied to summing junction 332 from the output of filter 130 will reduce the algebraic summation of signals at junction 332 to zero. As a result, diode 334 becomes forward biased to clamp the voltage at junction 338 to substantially 0 volts. Consequently, a voltage drop is developed to energize relay 336, and when relay 336 is energized contacts 342 are opened to de-energize solenoid 318. De-energization of solenoid 318 results in the actuation of valve 316 for causing motor 314 to operate in a direction for closing gate 312.

Delivery of material to the truck on platform 302 is therefore interrupted and the load of material in truck 304 will be the desired amount as determined by the pre-selected setting of potentiometer 328.

As shown in FIG. 8, the tare circuit 322 comprises a digital-to-analog converter 350 for converting a BCD data word into its equivalent analog signal voltage. As will be described in somewhat greater detail shortly, converter 350 is a sample and hold type circuit in that it will sample a BCD input and memorize it to maintain the equivalent analog signal voltage at its output until the memory is erased. One suitable form of converter 350 as described above is the Analogic Corporation Model No. 1216CDOA2AC.

Still referring to FIG. 8, the analog output of converter 350 is connected by a line 352 to summing junction 100. Converter 350 has a series of sets of BCD data word input pins corresponding to the latches that are utilized in latch network 154. Each set of BCD input pins has four pins for receiving a four-bit BCD data word. The BCD data output pins of latches 172–176 are respectively connected to separate sets of BCD data input pins at converter 350. It will be recalled that the information on the data output pins of latches 172–176 will be the data information which is memorized by latches 172–176 in response to the transfer of a latching signal from converter 132.

In addition to the foregoing data input pins, converter 350 has a "clear" pin 354 and a "set" pin 356. A push button switch 358 has two terminals respectively connected to ground and to the "clear" pin 354. Clear pin 354 is also connected through a resistor 360 to the positive terminal of a suitable power supply source such as 5 volts as shown. This positive 5 volt power source terminal is also connected through another resistor 362 to one contact of a further push button switch 364. The other contact of switch 364 is connected to the "set" pin 356, and pin 356 is also connected through a dropping resistor 366 to ground.

As shown, the data output pin of latches 172–176 are connected in parallel to the BCD data input pins of converter 350 by multiple conductors indicated at 370, 371, 372, 373 and 374. For displaying gross weights up to 9999 pounds (effectively 10,000 pounds) multiple conductor 374 may be eliminated so that converter 350 need only convert four, four-bit data words into an analog signal. For displaying gross weights greater than 10,000 pounds (say 50,000 pounds) multiple conductor 370 may be eliminated with some slight loss of accuracy so that converter 350 again will be required to convert only four four-bit data words.

Switches 358 and 364 are normally open as shown, and when it is desired to have converter 350 memorize the BCD data information at the output pins of latches 172–176, switch 364 is momentarily closed to apply the positive going voltage from source 375 to the "set" pin 356. At this instant, converter 350 will memorize the BCD data information supplied to its data input terminals and will convert the BCD data information into the equivalent analog signal voltage which is applied over line 352 to summing junction 100. The sampled signal memorized by converter 350 will be held even though the data information at the data output pins of latches 172–176 changes after the sampling.

From the foregoing circuitry it is clear that when the truck 304 is placed on platform 302, circuit 89 functions to provide the weight of the vehicle in terms of BCD data information at the output data pins of latches 172–176. When switch 364 is momentarily closed, this data information is sampled and memorized by converter 350, and converter 350 will therefore feed back the equivalent analog signal voltage to summing junction 100. The logic is selected so that the analog tare signal voltage on line 352 will be opposite in sign as compared with the load cell signal voltage applied to junction 100. As a result, the algebraic summation of signal voltages at summing junction 100 will reduce to substantially zero when switch 364 is momentarily closed after truck 304 is placed on platform 302.

When it is desired to remove the tare signal voltage applied by line 352 to summing junction 100, switch 358 is closed momentarily to momentarily clamp the "clear" pin 354 to ground. By clamping pin 354 to ground, the data information memorized by converter 350 is erased to prepare converter 350 for another taring operation.

Figure 8A:
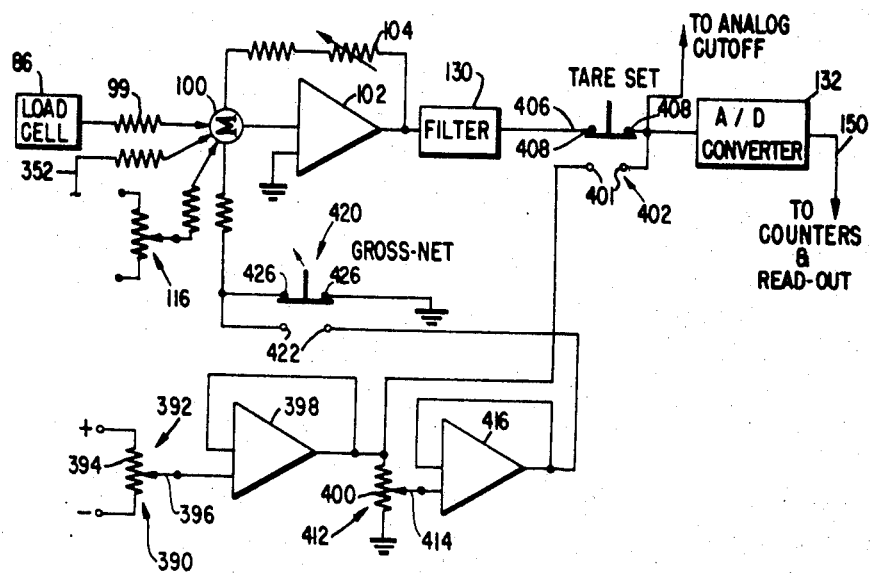
FIG. 8A illustrates another form of tare circuit.

As shown in FIG. 8A, tare circuit 322 is replaced by a tare circuit 390. It will be appreciated, particularly as this description proceeds, that the overall conditioning and read-out circuit 89 may optionally be equipped with both tare circuits 322 and 390 or with either one of the tare circuits 322 and 390 depending upon the application of the weighing system.

Circuit 390 comprises a potentiometer 392 having a resistor 394 and a movable wiper or arm 396. Resistor 394 is connected across a suitable source of power supply as shown, and wiper 396 is adjusted along resistor 394 to provide on wiper 396 the desired analog tare signal voltage.

Wiper 396 is connected through a voltage follower 398 to one terminal of a resistor 400. Wiper 396 is also connected through voltage follower 398 to one contact of a pair 401 in a double pole tare-set switch 402. The other contact of pair 401 is connected to the line or channel 406 which applied the output of filter 130 to the input of converter 132. The other contact pair of switch 402 is indicated at 408 in line 406. The contacts of pair 408 are respectively connected to the output of filter 130 and the input of converter 132 as shown. Thus when switch 402 is in the position shown, it completes a circuit connection between the output of filter 130 and the input of converter 132. When switch 402 is activated to its other position, it interrupts or breaks the circuit connection between the output of filter 130 and the input of converter 132 and completes the circuit across the contacts of pair 401 for completing a circuit connection from the output of voltage follower 398 to the input of converter 132. Thus in its illustrated position, switch 402 applies the weight-representing filter output voltage to the input of converter 132. In its non-illustrated position, switch 402 replaces the weight-representing analog signal voltage at the input of converter 132 with the output signal voltage of voltage follower 398, and the output voltage of follower 398 will be the analog tare signal voltage on wiper 396 of potentiometer 392.

With continued reference to FIG. 8A, the other terminal of resistor 400 is grounded as shown, and resistor 400 forms a part of a potentiometer 412 having a movable wiper or arm 414 which is adjustable along resistor 400. Wiper 414 is connected through another voltage follower 416 to one contact of a contact pair 422 in a gross-net double pole switch 420. The other contact of pair 422 is connected to summing junction 100. The second contact pair of switch 420 is indicated at 426, and the contacts of pair 426 are respectively connected to ground and to summing junction 100. When switch 420 is in its illustrated position ground or zero potential is applied to junction 100 through the switch. When switch 420 is actuated to its second position at the contact pair 422, it completes a circuit connection for applying the signal voltage at wiper 414 to summing junction 100. Circuit 390, as will now be described, may be utilized to apply a tare signal voltage to summing junction 100 instead of utilizing circuit 322.

To employ circuit 390 for setting a desired tare signal into the system, it is first necessary to ascertain the weight of the article to be tared out. In the example shown in FIG. 8, it is therefore necessary to determine the weight of truck 304.

Sometimes the tare weight of the truck is printed on the vehicle. If it is not, the unloaded truck is placed on platform 302 and its weight then may be read out at display device 170.

After the weight of the truck is ascertained, switch 402 is depressed to complete a circuit across the contacts of pair 401. By depressing switch 402, the circuit connection between filter 130 and converter 132 is interrupted and by completing the circuit across the contacts of pair 401, the potentiometer wiper 396 will be connected through voltage follower 398 to the input of converter 132. Thus, actuation of switch 402 to its unillustrated position replaces the weight-representing analog voltage signal with the signal developed by potentiometer 392. Converter 132, which is preferably of the bi-polar type as hereinafter described, will now convert the analog signal developed by potentiometer 392 into a pulse train in the manner described. This pulse train is loaded into the counter circuit 142 and when converter 132 supplies the latching pulse, the count in circuit 142 is memorized by the latching circuit 154. The memorized BCD data information at network 154 will be displayed in visual form by device 170 and/or printed form by printer 182. Display device 170 will therefore read out the analog signal voltage applied to wiper 396 in terms of weight during the time that the operator is adjusting wiper arm 396. Thus the operator will be able to observe the tare weight while he is making the adjustment of the tare with wiper arm 396.

When the operator completes the tare adjustment at potentiometer 392, he actuates switch 402 to its illustrated position to thereby replace the signal voltage developed by potentiometer 392 with the weight-representing filter output signal voltage. If cutoff circuit 320 is to be utilized to dispense an accurate, preselected amount of material to truck 302, switch 420 is depressed to complete a circuit across the contacts of pair 422 before the delivery of material is initiated. As a result, the adjusted tare signal voltage on wiper arm 396 will be applied through voltage followers 398 and 416 to summing junction 100 with a polarity that is equal and opposite to the load cell output signal voltage at junction 100. As a result, the algebraic summation of the signal voltages at junction 100 will be reduced substantially to a zero level. Thus, the signal voltage at the output of filter 130 and, consequently, the signal voltages applied to converter 132 and to circuit 320 will be reduced essentially to a zero level. Switch 340 (FIG. 9) is now actuated to open gate 312 for discharging the pre-selected desired amount of material to truck 304 in the manner previously described.

It will be appreciated that circuit 320 is an optional feature for use when it is desired to dispense an accurate, preselected amount of material into the vehicle or other container on platform 302. If, on the other hand, it is merely desired to fill truck 304 to its capacity and to thereafter determine the weight of material loaded into the truck, circuit 320 is not utilized.

Instead, the tare at potentiometer 392 is set by operation of switch 402 in the previously described manner. Then, material is dispensed into truck 304 on platform 302. During this time, switch 420 may be left in its illustrated, gross-weight position, or it may be actuated to its unillustrated net weight position. If switch 420 is left in its illustrated, gross-weight position, the tare signal voltage developed by potentiometer 392 will not be applied to summing junction 100. As a result, the load cell output signal voltage that is amplified and filtered will be the gross weight or the sum of the weights of the vehicle and the amount of the material loaded into the the vehicle.

As a result, device 170 will display the gross weight or more specifically the sum of the weights of truck 304 and the material delivered to truck 304. This gross weight may be printed out by printer 182.

When it is desired to determine the amount of material delivered to truck 304, switch 420 is depressed to complete a circuit across the contacts of pair 422, thereby applying the tare signal voltage developed on wiper 396 to summing junction 100. This tare signal voltage will effectively cancel out the portion of the load cell signal voltage representing the weight of the truck so that the algebraic summation of signal voltages at summing junction 100 will be the net weight or, more specifically, the weight of the material delivered to the truck.

Thus, the analog signal voltage representing the weight of material delivered to truck 304 will be applied to converter 132 and will consequently be displayed in digital form by device 170. This net weight also may be printed out by selective operation of printer 182.

The purpose of potentiometer 412 and voltage follower 416 is to cancel out the gain in the conditioning amplifier 102 so that the signal voltage level at the output of amplifier 102 will have that value which is furnished by potentiometer 392 and follower 398.

In comparison with tare adjustments such as, for example, calibrated thumb wheel circuits, circuit 390 of this invention provides a more convenient, less expensive arrangement for setting tare which utilizes the available high resolution electrical equipment in circuit 89. To achieve a correspondingly high resolution with conventional thumb wheel circuits, it is normally necessary to add costly circuits to achieve the comparable resolution which is available in circuit 89 and which is utilized by circuit 390 in this invention.

FIG. 10 shows a weigh-in and weigh-out arrangement utilizing circuits 89 and 322. In this embodiment a storage hopper or bin 450 is suitably suspended from and supported by one end of a fulcrumed lever 452 by a knife-edge assembly 454. Load cell 86 is connected to the other end of lever 452 as shown. Lever 452 is pivotally supported by a pivot and fulcrum assembly indicated at 456. A discharge gate 458 is provided for selectively closing the open bottom of hopper 450 and is operated between open and close positions by a suitable fluid motor 460. Circuits 89 and 322 are the same as that shown in FIG. 8, like reference characters being applied to designate like components.

For the application shown in FIG. 10, converter 132 is required to be of the bi-polar type. A conventional bi-polar type of analog-to-digital converter will digitize analog signals of both polarities and usually will furnish signal conditions to indicate whether the input analog signal is either positive or negative.

Hopper 450 may be in the form of a storage bin or silo. Circuits 89 and 322 are utilized to determine the weight of material in hopper 450 as well as the weight of material dispensed from hopper 450 as follows:

Hopper 450 is first filled to a suitable, desired level with switches 358 and 364 in their illustrated, open positions. As a result, the analog section of circuit 89 will apply to the input of converter 132 a signal voltage which is proportional to the weight of the material in hopper 450 after it is filled. This analog signal is digitized and read out in digit form. After hopper 450 is filled and before material is dispensed from hopper 450, switch 364 is momentarily closed to apply the necessary signal condition to pin 356 that causes converter 350 to sample and memorize the BCD data information at the output of latch network 154.

As a result, the data information memorized will be the weight of material in hopper 450 at the moment when switch 364 is closed before material is dispensed. This BCD information is converted by converter 350 into the equivalent analog-signal voltage and the equivalent analog signal voltage is applied by line 352 to summing junction 100 as previously described.

Consequently, the algebraic summation at junction 100 will reduce to substantially a zero voltage level. The digital read-out at device 170 and printer 182 will consequently be zero pounds. The apparatus is now conditioned for dispensing material from hopper 450.

Assume, for example, that there are 10,000 pounds of material in hopper 450 and that gate 458 is opened to dispense a portion of the load in hopper 450 into a truck or a container. Assume further that the amount dispensed was 2,000 pounds, thus leaving 8,000 pounds in hopper 450. The magnitude of the load cell output signal voltage will now be less than the tare signal voltage supplied over line 352. As a result, the algebraic summation of signal voltages at junction 100 will be an unbalanced negative signal condition. Thus a negative analog signal voltage proportional to 2,000 pounds will be applied to the input of converter 132. Converter 132 will generate a pulse train in which the number of pulses will be equivalent to 2,000 pounds. Converter 132 will supply a further signal indicating that the digitized signal voltage was negative. This signal may be applied over a channel 464 to a display 466, which is conveniently located adjacent to the weight display provided by device 170. Accordingly, the combined read-out of display devices 170 and 466 will indicate a negative 2,000 pounds, thus informing the operator that 2,000 pounds of material was dispensed from hopper 450.

If the operator now wishes to determine how much material is still in hopper 450, the operator momentarily closes switch 358 to apply ground potential to the "clear" pin 354. As a result, the memorized data information in converter 350 will be erased and the tare signal voltage on line 352 will go to zero. Now, the algebraic summation of the signal voltages at summing junction 100 will be proportional to the weight of material remaining in hopper 450. This weight is digitally displayed by device 170 and also may be printed out by printer 182.

As best shown in FIG. 2, a standard analog voltmeter 470 has a graduated scale 472 expressed in terms of percentage of full scale voltage, which in this example was taken as 10 volts. Voltmeter 470 is provided with the usual coil 474 for moving a pointer along scale 472. Coil 474 is connected in series with resistor 476, as shown.

According to a further aspect of this invention, resistor 476 forms a part of a potentiometer 478 having a movable wiper or arm 480 which is adjustable along resistor 476 to selectively vary the voltage that can be developed across coil 474. Wiper 480 is connected to a junction at the output of filter 130 so that the voltage on wiper 480 will be that of the weight-representing signal voltage at the output of filter 130.

By appropriately adjusting potentiometer 478, meter 470 will be made to read full scale (100 percent when a full scale or gross weight signal voltage (10 volts in the example of FIG. 2) is supplied at the output of filter 130. Potentiometer 478 thus effects a calibration so that the percentage readings furnished by meter 470 will correspond to the ratio of the weight-representing signal voltage to the full scale reading voltage as determined by the gain provided the adjustment of resistor 104.

As an example, it may be desired to read out an uncommon gross weight of 9,000 pounds by 1 pound graduations (i.e., counting in displayed increments of ones). Circuit card 180a is placed in the circuit as previously described, and resistor 104 is adjusted to bring the maximum scale down to 9,000 pounds. Now, potentiometer 478 is adjusted to make the maximum or 100 percent reading on meter 470 correspond to the filter output signal representing 9,000 pounds.

By adjusting potentiometer 478 to cause meter 470 to read full scale for any given gross weight, each of the meter scale graduations will represent the largest possible voltage. Accordingly, the accuracy of the meter readings will be improved. Meter 470, in addition to providing an instantaneous reading of the weight-representing signal voltage, is also useful in troubleshooting for malfunctions, for it will indicate whether the problem is in the analog part of the circuit or in the digital part of the circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a weighing apparatus, a structure for receiving a load to be weighed, an electrical circuit including signal producing means for producing an electrical weight-representing analog signal with a value that corresponds to the weight of a load applied to said structure, means for converting said analog signal into a digital representation, means providing a read-out of said digital representation, and feedback means comprising digital-to-analog sample and hold circuit means for sampling said digital representation and for producing an electrical analog tare signal with a value equivalent to that of the sampled digital representation, and circuit connection means connecting said digital-to-analog circuit means to said electrical circuit for applying said tare signal to said electrical circuit for taring said weight-representing signal by a magnitude that is determined by the sampled digital representation.

2. In a weighing apparatus, a structure for receiving a load to be weighed, an analog-to-digital converter, circuit means operatively associated with said structure for producing an electrical, weight-representing analog signal with a value that is representative of the weight of a load applied to said structure and for applying said analog signal to the input of said converter, said converter being operative to produce a digital representation of the analog signal applied to its input, means providing a read-out of said digital representation, means for providing a selectively set, analog tare signal, means for applying said tare signal to said circuit means for taring said weight-representing signal, and means for selectively replacing said weight-representing signal with said tare signal at the input of said converter.

* * * * *